United States Patent
Teoh et al.

(10) Patent No.: US 9,792,246 B2
(45) Date of Patent: Oct. 17, 2017

(54) LOWER-POWER SCRAMBLING WITH IMPROVED SIGNAL INTEGRITY

(71) Applicant: Intel Corporation, Santa Clara, CA (US)

(72) Inventors: Ee Loon Teoh, Folsom, CA (US); Eng Hun Ooi, Georgetown (MY); Christopher P Mozak, Beaverton, OR (US); Brian R McFarlane, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 14/583,623

(22) Filed: Dec. 27, 2014

(65) Prior Publication Data

US 2016/0188523 A1    Jun. 30, 2016

(51) Int. Cl.
*G06F 13/42* (2006.01)
*G06F 13/28* (2006.01)

(52) U.S. Cl.
CPC .......... *G06F 13/4282* (2013.01); *G06F 13/28* (2013.01); *Y02B 60/1228* (2013.01); *Y02B 60/1235* (2013.01)

(58) Field of Classification Search
CPC .......... G09G 3/36; G06F 13/40; G06F 13/42; G06F 13/38; G06F 11/10
See application file for complete search history.

(56) References Cited

U.S. PATENT DOCUMENTS

| 4,064,536 A | * | 12/1977 | Saeki | H04N 7/1713 348/E7.067 |
| 5,412,665 A | | 5/1995 | Gruodis et al. | |
| 6,240,432 B1 | | 5/2001 | Chuang et al. | |

(Continued)

FOREIGN PATENT DOCUMENTS

DE    112004000821    5/2006
EP    1069497 A2    1/2001

(Continued)

OTHER PUBLICATIONS

International Search Report and Written Opinion for PCT Patent Application No. PCT/US2015/062220, Mailed Mar. 31, 2016, 11 pages.

(Continued)

*Primary Examiner* — Henry Tsai
*Assistant Examiner* — Christopher a Daley
(74) *Attorney, Agent, or Firm* — Compass IP Law PC

(57) ABSTRACT

An I/O interface supports scrambling, where the scrambling can include nonlinear scrambling of the scrambling code, or dynamic bus inversion of the scrambling code, or selective switching of selected bits of the scrambling code, or a combination of these. The transmitting device includes a scrambler and the receiving device includes a descrambler. Both the scrambler and the descrambler generate a linear feedback scrambling code modified by applying one or more of the techniques mentioned above. The modified scrambling code may cause fewer than half of the scrambled output bits to be toggled with respect to a previous (Continued)

scrambled output. The scrambler applies the modified scrambling code to a signal to transmit. The descrambler applies the modified scrambling code to a received signal.

28 Claims, 8 Drawing Sheets

(56) References Cited

U.S. PATENT DOCUMENTS

| | | | |
|---|---|---|---|
| 6,389,138 B1* | 5/2002 | Li | H04B 1/707 370/209 |
| 6,640,236 B1 | 10/2003 | Lupin et al. | |
| 6,956,948 B1* | 10/2005 | Hwang | H04B 1/707 375/E1.002 |
| 7,426,532 B2 | 9/2008 | Bell et al. | |
| 7,501,963 B1* | 3/2009 | Hollis | G11C 7/1006 341/50 |
| 7,616,133 B2* | 11/2009 | Hollis | G06F 13/4234 341/51 |
| 7,793,195 B1 | 9/2010 | Wu | |
| 7,843,926 B1 | 11/2010 | Muller et al. | |
| 7,945,050 B2 | 5/2011 | Mozak | |
| 8,000,404 B2* | 8/2011 | Talbot | H04L 25/03866 327/141 |
| 8,503,678 B2 | 8/2013 | Falconer et al. | |
| 8,559,480 B2* | 10/2013 | Yoon | H04J 13/10 375/130 |
| 8,578,243 B2* | 11/2013 | Sommer | G06F 11/1048 713/193 |
| 8,942,309 B1* | 1/2015 | Ware | H04L 25/14 365/189.07 |
| 2002/0120897 A1 | 8/2002 | Eby | |
| 2003/0048903 A1 | 3/2003 | Ito et al. | |
| 2003/0188176 A1 | 10/2003 | Abbondanzio et al. | |
| 2004/0111663 A1 | 6/2004 | Lewis | |
| 2004/0205352 A1* | 10/2004 | Ohyama | G06F 21/85 713/194 |
| 2006/0041800 A1* | 2/2006 | Johnson | G06F 13/1694 714/720 |
| 2006/0085710 A1 | 4/2006 | Spica et al. | |
| 2006/0281425 A1 | 12/2006 | Jungerman | |
| 2007/0230687 A1 | 10/2007 | Talbot et al. | |
| 2007/0270902 A1 | 11/2007 | Slazas et al. | |
| 2007/0283231 A1* | 12/2007 | Hoyle | G06F 7/584 714/781 |
| 2007/0290902 A1 | 12/2007 | Bae et al. | |
| 2009/0027242 A1* | 1/2009 | Cideciyan | G11B 20/1426 341/95 |
| 2009/0086972 A1 | 4/2009 | Mozak | |
| 2009/0129448 A1* | 5/2009 | Koslov | H04J 13/10 375/148 |
| 2010/0013694 A1* | 1/2010 | Papageorgiou | H04L 17/02 341/173 |
| 2010/0153699 A1 | 6/2010 | Falconer et al. | |
| 2011/0156934 A1* | 6/2011 | Bae | H03K 19/00346 341/58 |
| 2012/0144277 A1* | 6/2012 | Lee | G06F 11/1004 714/807 |
| 2013/0101111 A1 | 4/2013 | Sharon et al. | |
| 2013/0262731 A1 | 10/2013 | Ranganathan et al. | |
| 2014/0192097 A1* | 7/2014 | Baek | G09G 3/3688 345/690 |
| 2015/0067197 A1* | 3/2015 | Hollis | G06F 12/00 710/16 |
| 2015/0139355 A1* | 5/2015 | Hollis | H04L 1/0042 375/296 |
| 2015/0222416 A1* | 8/2015 | Saito | H04L 7/043 375/362 |
| 2016/0012888 A1* | 1/2016 | Pirovano | G11C 13/0069 365/163 |

FOREIGN PATENT DOCUMENTS

| | | |
|---|---|---|
| TW | I409636 | 11/2006 |
| TW | 200941337 | 10/2009 |
| WO | 2014145831 A1 | 9/2014 |

OTHER PUBLICATIONS

Chinese and English translation of Notice of Allowance for Taiwan Patent Application No. 104139408, Mailed Feb. 13, 2017, 4 pages.

\* cited by examiner

LOWER-POWER SCRAMBLING WITH IMPROVED SIGNAL INTEGRITY

FIELD

Embodiments of the invention are generally related to inter-device communication, and more particularly to scrambling on the I/O (input/output) interface with lower power and improved signal integrity.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2014, Intel Corporation, All Rights Reserved.

BACKGROUND

Computing devices include many integrated circuit components coupled by inter-device interfaces or connections. As device sizes decrease, rail-to-rail voltages decrease, and operating and communication frequencies increase, electromagnetic effects have increased effect on inter-device communication. Real-world implementations of inter-device communication often experience signal integrity issues due to power supply noise and electromagnetic interference. Scrambling codes can reduce the negative effects of power supply noise and electromagnetic interference by changing the bit patterns of inter-device communication to reduce electromagnetic coupling effects.

However, especially as device sizes continue to decrease and find more usage in mobile devices, the power consumption of scrambling can be significant relative to overall power budgets. Scrambling traditionally applies codes to achieve approximately 50% toggles from one transmission to the next. As will be understood, frequent toggling creates significantly more dynamic power consumption than infrequent toggling. Thus, there is a tension between applying scrambling with frequent toggling to maintain signal integrity at the cost of increasing inter-device communication power consumption. Additionally, traditional scrambling is based on linear transformations, which can cause unintended cross-lane and/or cross-cycle correlation. Cross-lane correlation refers to correlation between adjacent signal lines. Cross-cycle correlation refers to correlation between consecutively transmitted signals. Correlation between adjacent signal lines and/or consecutive signals can result in increased electromagnetic interference.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
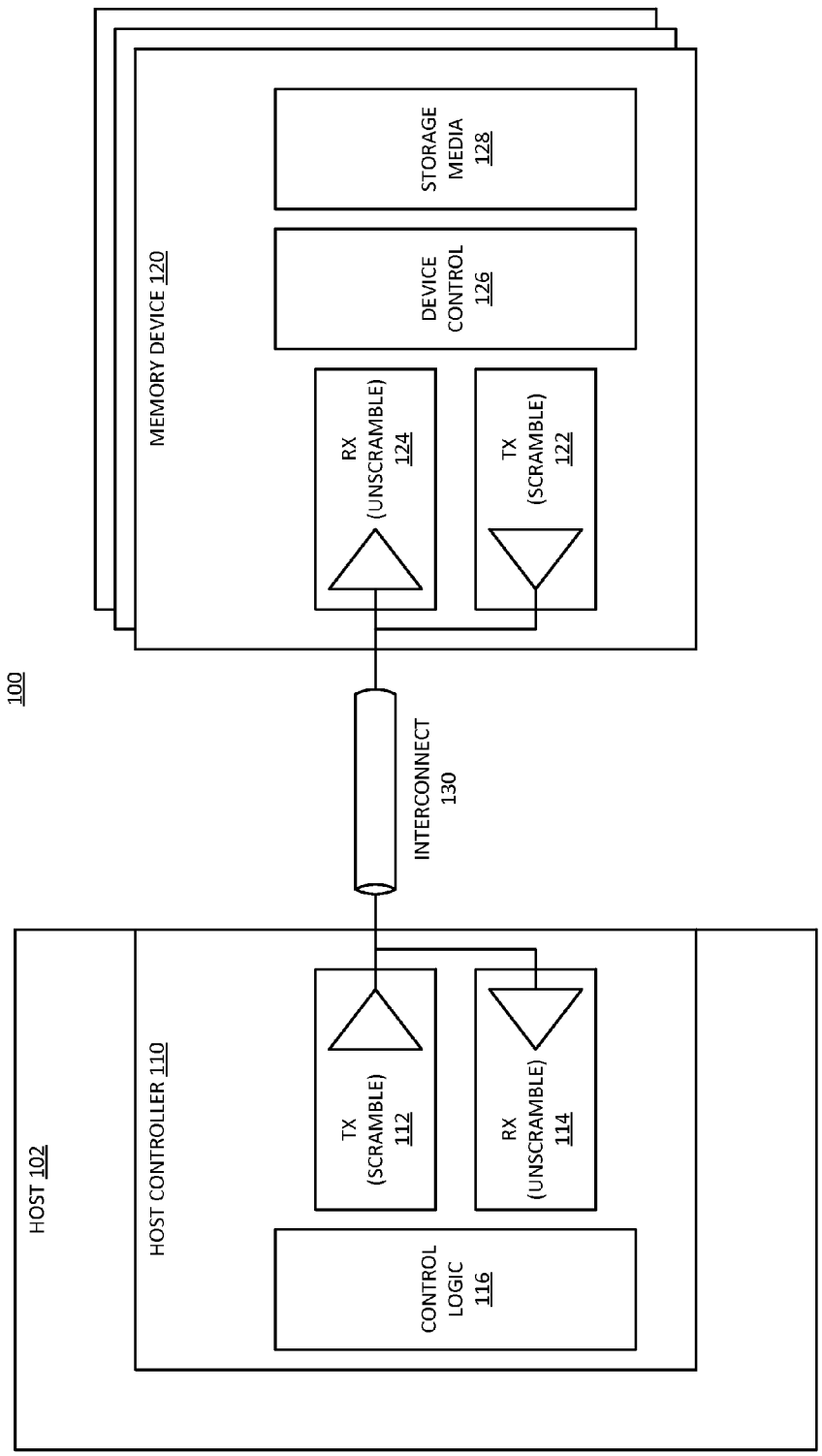
FIG. 1 is a block diagram of an embodiment of a system where both the transmitting and receiving devices include scrambling and descrambling circuits.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, an I/O interface supports more robust and more power efficient scrambling based on improved scrambling codes. In one embodiment, scrambling codes can include nonlinear scrambling, or dynamic bus inversion, or selective switching of selected bits, or a combination of these. The transmitting device includes a scrambler and the receiving device includes a descrambler. Both the scrambler and the descrambler generate a linear feedback scrambling code modified by applying one or more of the techniques mentioned above for improved scrambling codes. The modified scrambling code can cause fewer than half of the scrambled output bits to be toggled with respect to a previous scrambled output. The scrambler applies the modified scrambling code to a signal to transmit. The descrambler applies the modified scrambling code to a received signal.

It will be understood that having a scrambler at the transmitter and a descrambler at the receiver will require synchronization of the scrambler and descrambler to ensure that the descrambler uses the same or complementary codes used by the scrambler to properly extract the transmitted signal. In one embodiment, both the scrambler and descrambler follow a pattern or algorithm of codes or code generation operations. Thus, they can increment or move in unison from one code to the next. In one embodiment, the scrambler and descrambler stay synchronized via a command or an additional signal over the communication interface between them. In one embodiment, both the scrambler and descrambler perform scrambling code operations which can include nonlinear scrambling, or dynamic bus inversion (DBI), or selective switching of selected bits, or a combination of these. Traditional scrambling operated only on a data bus. In one embodiment, scrambling as described herein can be applied to the data bus. Scrambling as described herein can also be applied to command and/or address information for a memory subsystem.

In one embodiment, providing nonlinearity in the scrambling code can improve the signal integrity and reduce electromagnetic interference over an inter-device interconnect. An inter-device interconnect includes an interface from one integrated circuit to another. In one embodiment, the integrated circuits are part of separate packages. In one embodiment, the integrated circuits are part of separate chips integrated together in a multi-chip package. Nonlinear scrambling codes can reduce cross-lane correlation and cross-cycle correlation. Use of DBI can reduce the amount of power used to apply scrambling. Use of selective switching can also reduce the amount of power used to apply scrambling. DBI can be applied to reduce the number of toggles from one cycle to the next. Thus, applying DBI to the scrambling code can reduce the number of toggles in the scrambling code, reducing power consumption relative to an application of scrambling that does not use DBI. Selective switching can selectively hold one or more lanes or signal lines constant from one cycle to the next, which also reduces the number of toggles that would otherwise occur in traditional scrambling code generation. Any one or more of these techniques can reduce the number of toggles, which enables the scrambling code to produce a toggle rate of less than 50% on the signal lines.

Descriptions herein reference examples including scrambling communication for exchange over an interconnect or over a communication interface between a host or memory controller and a memory device. In one embodiment, the scrambling/descrambling described in any embodiment herein is performed for an I/O (input/output) interface other than an interface coupled to a memory device. Thus, the scrambling code generation can be performed for inter-device communication other than for a memory device.

Reference to memory devices can apply to different memory types. Memory devices generally refer to volatile memory technologies. Volatile memory is memory whose state (and therefore the data stored on it) is indeterminate if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), WIO3 (Wide I/O 3, currently in discussion by JEDEC), HBM2 (HBM version 2), currently in discussion by JEDEC), and/or others, and technologies based on derivatives or extensions of such specifications. In addition to, or alternatively to, volatile memory, in one embodiment, reference to memory devices can refer to a nonvolatile memory device whose state is determinate even if power is interrupted to the device. Thus, a memory device can also include a future generation nonvolatile devices, such as a three dimensional crosspoint memory device, or other developing nonvolatile memory device. A memory device as described herein can also include flash, phase change memory, spin-torque memory, or other nonvolatile memory device.

FIG. 1 is a block diagram of an embodiment of a system where both the transmitting and receiving devices include scrambling and descrambling circuits. System 100 represents one example of a system in which improved scrambling code generation can be applied. System 100 can include elements of a memory subsystem. Host 102 represents a host system, which includes a primary processor (not specifically shown) that executes a host operating system for a device of which system 100 is a part. The execution of code and operations by the processor creates requests for data stored in one or more memory devices 120. Host controller 110 represents a controller at host 102 that is responsible for generating memory access commands to memory devices 120 to satisfy the requests.

In one embodiment, memory device 120 is a volatile memory device. In one embodiment, memory device 120 includes a nonvolatile memory device. In the case that all of memory device 120 is nonvolatile storage, host controller 110 can be referred to as a storage controller, which accesses persistent data storage in system 100. In the case that all of memory device 120 is volatile storage, or a nonvolatile storage that operates at access frequencies and with access technologies similar to volatile storage, host controller 110 can be referred to as a memory controller, which accesses code loaded for execution and/or temporary or cached data within system 100.

Host controller 110 is coupled to memory device 120 via interconnect 130. Host controller 110 controls the flow of information into and out of memory device 120. In one embodiment, host controller 110 is integrated onto the same integrated circuit as one or more processing cores of host 102. In one embodiment, host controller 110 is part of a separate integrated circuit such as a memory controller hub. Host controller 110 includes transmit (TX) data path 112 and receive (RX) data path 114. TX 112 and RX 114 enable host controller 110 to improve I/O reliability by scrambling transmitted data to be unscrambled at memory device 120.

In one embodiment, control logic 116 generates, in parallel, a plurality of pseudo random outputs that are uncorrelated with one another. TX 112 is labeled "scramble," referring to the fact that elements of control logic 116 can scramble the TX signal prior to transmission. In similar manner, RX 114 is labeled "unscramble," referring to the fact that elements of control logic 116 can unscramble the RX signal after it is received. The scrambling can be considered part of transmitting. The unscrambling can be considered part of the receiving or the receive processing. TX 112 and RX 114 operate on the host side at host controller 110. In one embodiment, in addition to scrambling a data bus, control logic 116 can use the same scramble code to scramble a memory access or storage access command, and/or an address, along with the data.

In one embodiment, control logic 116 uses a combination of parallel LFSR (linear feedback shift register) and reordering and remapping logic that modifies the output of the LFSR. In one embodiment, control logic 116 uses DBI (dynamic bus inversion). In one embodiment, control logic 116 uses toggle minimization logic. It will be observed that memory device 120 includes similar scramble logic features as host controller 110. For example, memory device 120 includes RX path 124, labeled "unscramble," referring to the fact that memory device 120 unscrambles the scrambled signals received from TX 112 of host controller 110. As another example, memory device 120 includes TX path 122, labeled "scramble," referring to the fact that memory device 120 can scramble signals sent to host controller 110. Device control 126 represents logic that can perform the scrambling operations. As used herein, scrambling operations can refer generically to operations both for scramble and unscramble, including generating a scrambling code and modifying a scrambling code.

In one embodiment, control logic 116 and/or device control 126 apply a nonlinear scrambling operation to generate a scrambling code. In one embodiment, the nonlinear scrambling operation is a bit remapping of a linear scrambling code output. In one embodiment, control logic 116 and/or device control 126 apply DBI to a linear scrambling code output. In one embodiment, control logic 116 and/or device control 126 apply selective switching of selected bits of the scrambling code. Selective switching can include holding certain bits or certain lanes constant from one cycle of output to the next, while changing other bits in accordance with a modified scrambling code. It will be understood that selective switching does not necessarily mean toggling all bits that are selected. Rather, some bits selected for applying a code may change while others may not. The selectivity is in the fact that some of the bits or lanes are held constant while a modification is allowed for others, regardless of whether the scrambling code change toggles the bits or not. For example, the logic could hold certain lanes constant (e.g., even lanes) and allow other lanes (e.g., odd lanes) to change. The example is non-limiting, and other combinations of lanes could be used. In one embodiment, an equal number of lanes are selected to maintain a white frequency spectrum. In one embodiment, control logic 116 and/or device control 126 apply a combination of two or more of a nonlinear scrambling operation, selective switching of selected bits of the linear scrambling output, and DBI.

After generating a scrambling code by generating the linear code and modifying it with one or more of the scrambling operations described above, control logic 116 and/or device control 126 can process a signal with the scrambling code. For transmit, processing the signal can include combining the TX signal with the scrambling code to scramble the transmit signal. For receive, processing the signal can include combining the RX signal with the scrambling code to decode or unscramble the received signal and extract the information from it necessary to perform the requested operation(s). It will be understood that memory device 120 can represent multiple memory devices combined in parallel. In one embodiment, on transmit, host controller 120 can scramble a signal to send in parallel to multiple memory devices 120, which will each separately unscramble and decode the signal.

In one embodiment, control logic 116 and/or device control 126 can selectively generate a "new" scrambling code for a subsequent cycle without having to generate a new linear scrambling code. The controllers can use the same original linear scrambling code to generate multiple modified scrambling codes for consecutive transactions. For example, the controllers can apply different additional scrambling operations to the same linear scrambling code to generate multiple unique codes without having to use the power necessary to generate a new linear scrambling code (e.g., without having to generate an output from an LFSR).

Memory device 120 includes storage media 128, which represents one or more storage arrays or other memory resources that store data. As described above, memory device 120 can be a nonvolatile or a volatile memory device; thus, storage media 128 can include volatile or nonvolatile storage. In one embodiment, storage media 128 includes a combination of volatile and nonvolatile resources. Host controller 110 accesses specific memory locations in storage media 128 via addressing the specific locations with the access command. In one embodiment, device control 126 descrambles or unscrambles address and command information from a signal received from host controller 110 via RX 124.

Thus, control logic 116 and device control 126 can represent two controllers, one on each side of interconnect 130. With traditional scrambling, the scrambling is transparent to the memory device, which stores scrambled data, and then returns scrambled data for the memory controller to unscramble prior to use. However, by enabling memory device 120 to unscramble the data, it can also independently scramble the data on return to host controller 110, which can improve performance relative to signal integrity and electromagnetic interference because device control 126 can adjust the scrambling specific to a read transaction. It will be understood that storing and returning scrambled data can still result in interference from the memory device side depending on the order in which data is accessed and transmitted out of storage media 128.

It will be understood that with two separate controllers, system 100 will need to ensure that information can be scrambled on one side before transmission through interconnect 130, and unscrambled on the other side upon receiving it. All information transmitted through the interconnect 130, whether command, address, or data can be scrambled before transmission and unscrambled upon receiving. Application of scrambling at both sides of the interconnection interface can suppress noise from affecting the command and address as well as the data over interconnect 130.

In one embodiment, specific scramble operations are particular to an operating state or a power state of a computing device of which system 100 is a part. For example, control logic 116 and device control 126 can be configured to perform scrambling operations when a computing device enters and/or operates in a power state for implementing data exchanges with memory device 120, such as a boot-up sequence, or a particular power state, or other operating mode.

Figure 2:
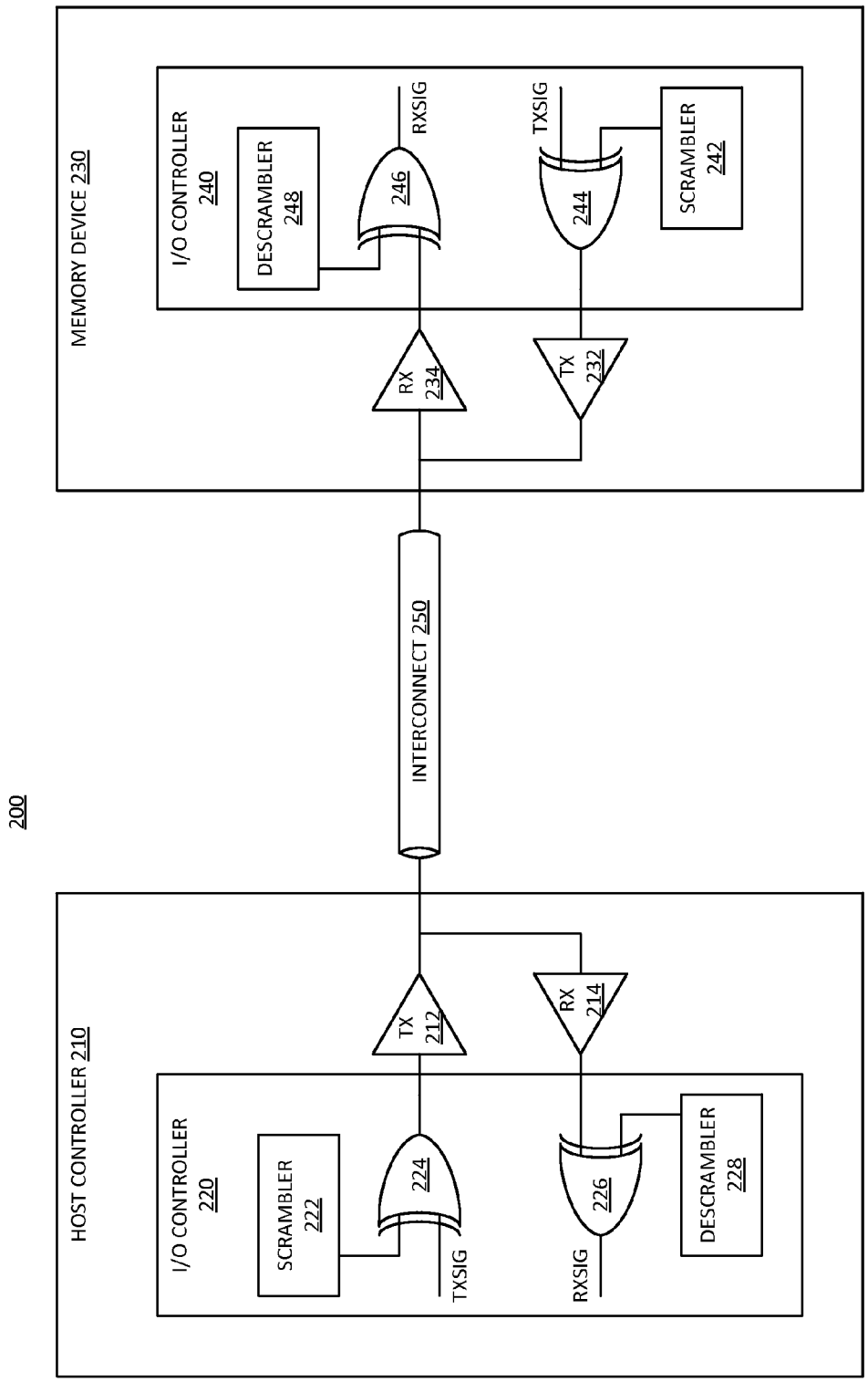
FIG. 2 is a block diagram of an embodiment of a system that supports scrambling and unscrambling at both ends of a communication interface, with improved scrambling codes.

FIG. 2 is a block diagram of an embodiment of a system that supports scrambling and unscrambling at both ends of a communication interface, with improved scrambling codes. System 200 represents a system in which both ends of a communication generate an improved scrambling code for use in scrambling operations, and can represent one example of system in accordance with system 100 of FIG. 1. Specific to the example of system 200 is that it can represent components of a memory subsystem. The memory subsystem example is for illustration only, and is not limiting.

Host controller 210 represents a controller at a host processor that controls access to memory device 230. Host controller 210 can be a storage controller or memory controller. Host controller 210 includes TX 212 which represents transmit hardware, and RX 214 which represents receive hardware. The transmit and receive hardware can include drivers, signaling logic, pads, traces, and other hardware components. Memory device 230 similarly includes transmit hardware TX 232 and receive hardware RX 234.

I/O controller 220 of host controller 210 and I/O controller 240 of memory device 230 represent control circuits and/or other logic to control the operation of respective transmit and receive hardware. Specifically illustrated are scrambler 222 and descrambler 228 in I/O controller 220 and scrambler 242 and descrambler 248 in I/O controller 240. Scramblers 222 and 242 represent logic to scramble a transmit signal (TXSIG). Descramblers 228 and 248 represent logic to unscramble or descramble a receive signal (RXSIG). Both the scramblers and descramblers apply scrambling code to perform their respective scrambling operations. The scrambling codes can be in accordance with any scrambling code and modified scrambling code described herein. In one embodiment, both the scramblers and descramblers in each I/O controller utilize the same hardware logic to generate scrambling codes. In one embodiment, the scrambler generates the scrambling code with hardware separate from hardware used by the descrambler to generate the scrambling code. While system 200 does not specifically show a synchronization mechanism, it will be understood that I/O controllers 220 and 240 can include synchronization mechanisms to ensure that a code used to scramble a transmit signal at one end is the same code generated at the other end to unscramble the received signal. Such mechanisms can include timing logic, signaling logic, or some other logic, or a combination.

In one embodiment, scrambler 222 generates (or obtains from hardware logic that generates) a scrambling code to combine with TXSIG to be output via TX 212. In one embodiment, combination logic 224 is XOR logic to XOR the outputs of scrambling logic with TXSIG to provide a pseudorandom pattern to the transmitted signal. In one embodiment, descrambler 248 generates (or obtains from hardware logic that generates) the same scrambling code used by scrambler 222, and combines the scrambling code with combination logic 246 with the scrambled signal received via RX 234. In one embodiment, combination logic 246 is XOR logic to XOR the outputs of scrambling logic with the incoming signal to remove the pseudorandom pattern and generate unscrambled RXSIG.

When memory device 230 sends scrambled signals to host controller 210, the operations occur in reverse. Thus, in one embodiment, scrambler 242 generates (or obtains from hardware logic that generates) a scrambling code to combine with TXSIG to be output via TX 232. In one embodiment, combination logic 244 is XOR logic to XOR the outputs of scrambling logic with TXSIG to provide a pseudorandom pattern to the transmitted signal. In one embodiment, descrambler 228 generates (or obtains from hardware logic that generates) the same scrambling code used by scrambler 242, and combines the scrambling code with combination logic 226 with the scrambled signal received via RX 214. In one embodiment, combination logic 226 is XOR logic to XOR the outputs of scrambling logic with the incoming signal to remove the pseudorandom pattern and generate unscrambled RXSIG.

In one embodiment, I/O controller 220 and I/O controller 240 generate scrambling codes that include a nonlinear aspect (e.g., via signal reordering logic and/or remapping logic), include bits inverted by scrambling code DBI logic, or include scrambling code generated by selectively switching old code and new code, or include a combination of these. In one embodiment, I/O controllers 220 and 240 generate scrambling codes for a series of consecutive cycles. Traditionally, the scrambler would generate a new nonlinear code for each subsequent cycle. In one embodiment, the scrambling logic generates a sequence or consecutive series of scrambling codes from a single nonlinear code. Thus, the scrambling logic can generate multiple different scrambling codes from the same nonlinear starting code. For example, the scrambling logic can apply different additional scrambling operations or scrambling code modifications multiple times to the same nonlinear starting code.

In one embodiment, I/O controllers 220 and 240 can scramble and unscramble signals having more bits than the width of the scrambling code. Thus, consider a scrambler that is M bits wide. The scrambler can scramble an N-bit wide signal, where N>M. Generally $M^2/4>M$ (e.g., $32^2$ is $2^{10}$, and divided by 4 is $2^8$, or 256 which is greater than 32). By splitting the scrambling code into M/2 XOR M/2, system 200 can use less expensive scrambling code generators or scramblers with minimal loss of benefits. For example, the above example illustrates that a 32 bit scrambler can be used to replace a 256 bit scrambler. Such a result can be accomplished by splitting the bus and XORing all combinations. Thus, in one embodiment, combination logic 224, 226, 244, and 246 can include mechanisms that enable the bus splitting and combining described. In one embodiment, each component 224, 226, 244, 246 can represent multiple XOR or combination logic elements.

In general, the scrambling logic can generate scrambling codes to apply by generating a scrambling code and splitting it into different combinations of Y subsets of scrambling code segment. In one embodiment, the scrambling logic can generate Y subsets of scrambling codes or Y code segments from a single M-bit scrambling code. It will be understood that each segment or subset will have fewer than M bits. The scrambling logic can then selectively XOR different combinations of bits chosen from each of the Y subsets to create a modified scrambling code. Thus, the scrambling logic can generate a modified scrambling code form XORing selected combinations of bits from Y code segments, and apply the modified scrambling code to a signal having more than M bits. In one embodiment, the Y subsets are two subsets of equal number of bits. In another embodiment, the M-bit code can be split up unequally into two groups of different combinations of (M_subset1 XOR M_subset2), and be XORed to create up to M_subset1 times M_subset2 combinations. In another embodiment, the M-bit code can be split into 3 or more subsets and one bit from some or all of the subsets can be XORed together to create the final scrambling code pattern.

Figure 3:
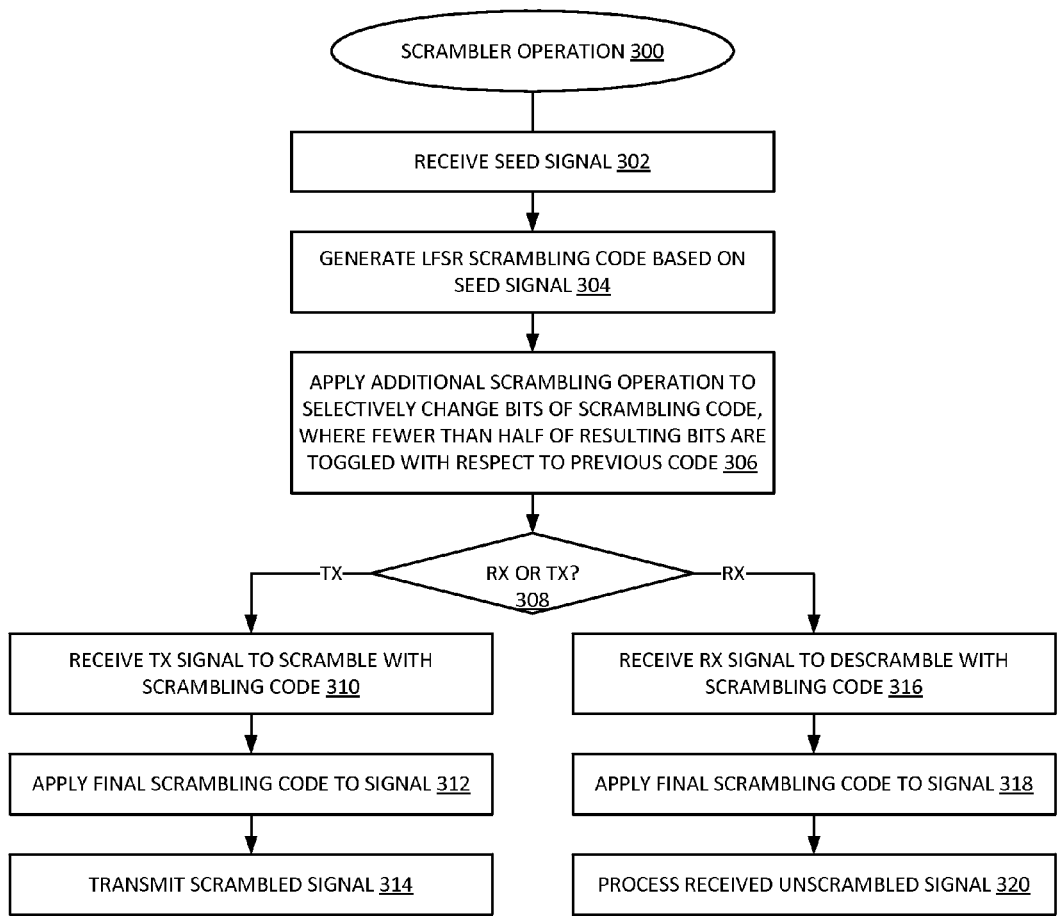
FIG. 3 is a flow diagram of an embodiment of a process for implementing scrambling with improved scrambling codes.

FIG. 3 is a flow diagram of an embodiment of a process for implementing scrambling with improved scrambling codes. Process 300 illustrates one example of scrambling operations that can be performed by scrambling logic in accordance with any embodiment described herein. More specifically, I/O controllers 220 and 240 of system 200, and control logic 116 and device control 126 of system 100 can implement the process.

In one embodiment, the scrambler or scrambling code generator receives a seed signal, 302. The seed signal can be a pseudorandom number as an input starting point for the generation logic to generate a scrambling code. In one embodiment, the seed signal can be the previous scrambling code. In one embodiment, the scrambler generates an LFSR scrambling code or other linear-based scrambling code from the seed signal, 304. The scrambler applies one or more additional scrambling operations to selectively change bits of the scrambling code, 306. The additional scrambling operations change bits selectively, and result in a modified scrambling code where fewer than half of the resulting bits are toggled with respect to a previous code, on average. It may be that from one code to the next a subsequent code has an equal number of toggles. However, on average, the toggled bits are fewer than half. Such a change results in lower power usage by the scrambler. Such a result is in contrast to traditional methods that seek to toggle half the bits on each consecutive code.

In one embodiment, the additional scrambling operation can include applying a nonlinear scrambling operation. Such a nonlinear scrambling operation can include, but is not limited to, performing a bit remapping of the scrambling code to selectively change some of the scrambling code bits, applying DBI to the scrambling code, applying selective switching of selected bits of the scrambling code, toggling either even or odd lanes of the scrambling code, or a combination of these. In one embodiment, the scrambler applies different additional scrambling operations to the same LFSR scrambling code to create different consecutive modified scrambling codes.

For a scrambler generating a modified scrambling code for transmit, 308 TX branch, the scrambler receives the signal to scramble and transmit, 310. The scrambler applies the final or modified scrambling code to the signal, 312, and transmits the scrambled signal, 314. For a scrambler generating a modified scrambling code for receive processing, 308 RX branch, the scrambler receives the signal to descramble, 316. The scrambler applies the final or modified scrambling coded to the signal, 318, and processes the received unscrambled signal, 320. The receiving device can then perform the operation indicated by the received signal. In one embodiment, the TX signal includes scrambled information for command and address information in a memory or storage access command. Thus, the unscrambled signal can include command or address information.

Figure 4:
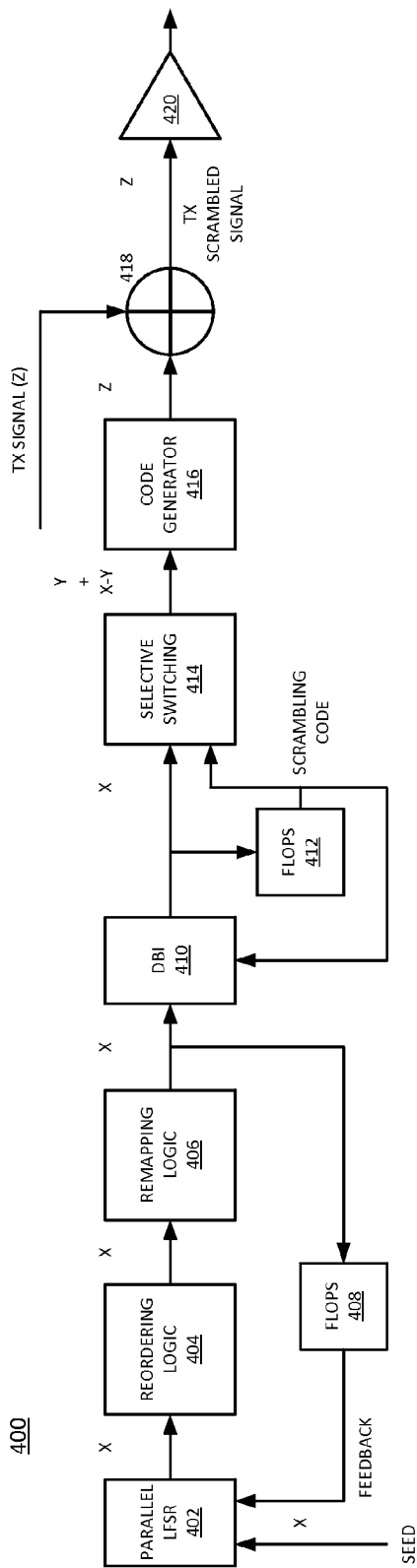
FIG. 4 is a block diagram of an embodiment of a system that supports scrambling including nonlinear scrambling codes, selectively applied DBI, and selective code filtering.

FIG. 4 is a block diagram of an embodiment of a system that supports scrambling including nonlinear scrambling codes, selectively applied DBI, and selective code filtering. Circuit 400 represents logic to implement a scrambler in accordance with any embodiment described herein, and can be referred to as scrambler 400. Scrambler 400 can be one example of logic within I/O controllers 220 and 240 of system 200, and control logic 116 and device control 126 of system 100. Scrambler 400 can be implemented in logic within a processor device.

In one embodiment, scrambler 400 starts with a fixed seed (X-bit), which is the same seed that a controller or scrambler on the receiving end will start with. In one embodiment, scrambler 400 starts with a feedback output (X-bit) received from a stage of modifying the scrambling code. In one embodiment, scrambler 400 includes parallel LFSR 402, which receives the seed value, and generates an X-bit LFSR output. LFSR 402 can be a linear transform block that takes an X-bit input and transforms it to an X-bit output by XORing various inputs together. In one embodiment, LFSR 402 provides its output to reordering logic 404. Reordering logic 404 can selectively reorder output bits from the LFSR to randomize the output, and generates an X-bit output from an X-bit input. In one embodiment, reordering logic 404 provides its output into remapping logic 406. In one embodiment, remapping logic 406 applies a nonlinear transform to the input data to generate an output. In one embodiment, remapping logic 406 utilizes (X/N) substitution boxes, where X is a multiple of N. Each substitution box can take an N-bit input and produce an N-bit nonlinear output. Remapping logic 406 generates an X-bit output. In one embodiment, scrambler 400 feeds the output of remapping logic 406 back to parallel LFSR 402 as the seed for a subsequent scrambling code. Flops 408 represent one or more logic devices such as latches that can hold the data for subsequent use. Flops 408 can include a multiple levels to queue data for use in a subsequent code but not necessarily the immediately subsequent code.

It has been found that carefully choosing LFSR 402 and a substitution box (S-Box) combination, can achieve a property referred to as avalanche, where every output bit depends on every input bit. Simpler LFSRs used by traditional scrambler designs cannot achieve avalanche. By selection of the specific operations performed by LFSR 402 and remapping logic 406 (e.g., selecting S-Box design and operation), scrambler 400 can minimize correlation and differential probabilities between the lanes and cycles. Lanes refer to parallel signal lines used to transfer the data. Cycles refer to consecutive exchange (e.g., transmit, receive) transactions. Minimizing differential probabilities between the lanes and cycles leads to a more random scrambling code that minimizes correlation between lanes and/or cycles. In other embodiments, scrambler 400 can be optimized for criteria in addition to, or in place of, minimizing correlation between lanes/cycles. Thus, different S-Box implementations can configure the scrambling logic for different remapping for improving any of a number of different criteria such as correlation, noise, timing, or other criteria for the I/O interface to be scrambled.

In one embodiment, scrambler 400 includes DBI logic 410 to process the scrambling code. DBI 410 can receive the output of remapping logic 406 and compare it with the scrambling code of a previous scrambling cycle. Depending on the implementation, in one embodiment, DBI 410 optionally inverts the scrambling code bits if the number of bits that toggle is greater than a predetermined threshold. Thus, DBI 410 can improve the power used by scrambler 400 by reducing the number of toggling bits. In one embodiment, scrambler 400 includes flops 412, which represents one or more logic devices such as latches or other logic that can hold the data for subsequent use. In one embodiment, flops 412 feeds the output from DBI 410 back to DBI 410 for comparison with a subsequent scrambling code. Thus, scrambler 400 can determine if the new scrambling code has a number of bits that is greater than a threshold. It will be understood that the application of DBI 410 to the scrambling code does not necessarily mean that a DBI indication signal (e.g., a DBI bit indicating whether or not the signal is inverted) needs to be sent from the transmitter to the receiver. DBI 410 provides a pseudorandom code, and simply needs to be repeatable on both sides (i.e., TX and RX) sides of the link or I/O interface, and does not need to be "undone" at the receiving end. Thus, unlike traditional applications of DBI in I/O systems, DBI 410 can be applied without generating or sending an indication across the I/O interface.

In one embodiment, scrambler 400 includes selective switching 414. In one embodiment, selective switching 414 receives the output of DBI 410 two different ways. As illustrated, selective switching 414 can be coupled to directly receive the output of DBI 410, and can be coupled to receive the output of DBI 410 via flops 412. Selective switching 414 enables scrambler 400 to switch some of the lanes or bits of the scrambling code in accordance with the scrambling operations performed, and to leave some of the lanes or bits the same as a previous cycle of the code. Flops 412 holds and provides the scrambling code of the previous cycle. Thus, selective switching 414 can generate an output based on a current cycle or iteration of a scrambling code as generated via logic 402, 404, 406, and 410, and selectively on the previous scrambling code.

For example, in one embodiment, selective switching 414 selects Y bits out of the X bits of the scrambling code. The Y bits will take on the new code as provided by the direct coupling to DBI 410. Selective switching causes the remaining X minus Y bits (X-Y) to maintain their bit values based on the previous cycle scrambling code. In one embodiment, selective switching 414 can select a different group of Y bits every cycle, or every fixed number of cycles. When selective switching 414 selects a different group of Y bits on each cycle, the average output is updated every Y/X cycles instead of every cycle. Selective switching 414 can provide improved tradeoff between scrambling effectiveness and power consumption while still maintaining a constant switching rate for low dI/dT. In one embodiment, selective switching 414 selects Y switching lanes equally spaced through the X lanes, which can spread the switching in space as well as in time. Thus, selective switching 414 can generate both Y bits that are scrambled and X-Y bits that are held constant from the previous cycle for a total output of X bits. It will be understood that Y is a number less than X, but could be more or less than X/2.

Code generator 416 generates the final scrambling code or the resulting modified scrambling code. Code generator 416 provides the modified scrambling code to combiner 418 to apply to the TX signal to scramble the signal. In one embodiment, TX signal includes data to be scrambled, and address and/or command is separately combined with the TX signal. In one embodiment, the TX signal includes command and/or address information in addition to data information. It will be understood that data in this context refers to a signal to be sent over a data bus, which can be separate from a command/address (C/A) bus that provides information indicating what operations to perform on what locations of memory.

The TX signal is Z bits in width, where Z can be a number different from X. X and Z can be equal. In one embodiment, Z is greater than X, and scrambler 400 can scramble the Z-bit output signal with an X-bit scrambling code. Combiner 418 generates TX scrambled signal (a Z-bit signal) to output over transmission hardware, represented by block 420. In one embodiment, scrambler 400 applies the X bit scrambling code to scramble the Z bits of TX signal, where Z is less than X, or the signal to transmit has fewer lanes than the scrambling code (Z lanes<X lanes). In one embodiment, scrambler 400 applies the X bit scrambling code to scramble the Z bits of TX signal, where Z is greater than X, or the signal to transmit has more lanes than the scrambling code (Z lanes>X lanes). For example, combiner 418 can split the X bit scrambling code into two segments of (X/2) bits each, and employ a 2-input XOR to create various combinations of the bits. In such an example, it is possible to scramble $(X/2)^2$ lanes (e.g., a 16-bit code can cover 64 lanes (16/2=8; 8*8=64). The application of the scrambling code by splitting the scrambling code can reduce the overhead associated with the scrambling logic for wide buses. Other combinations are obviously possible using different numbers of lanes, and different sizes for XOR logic and/or S-Box sizes or other remapping logic.

Figure 5:
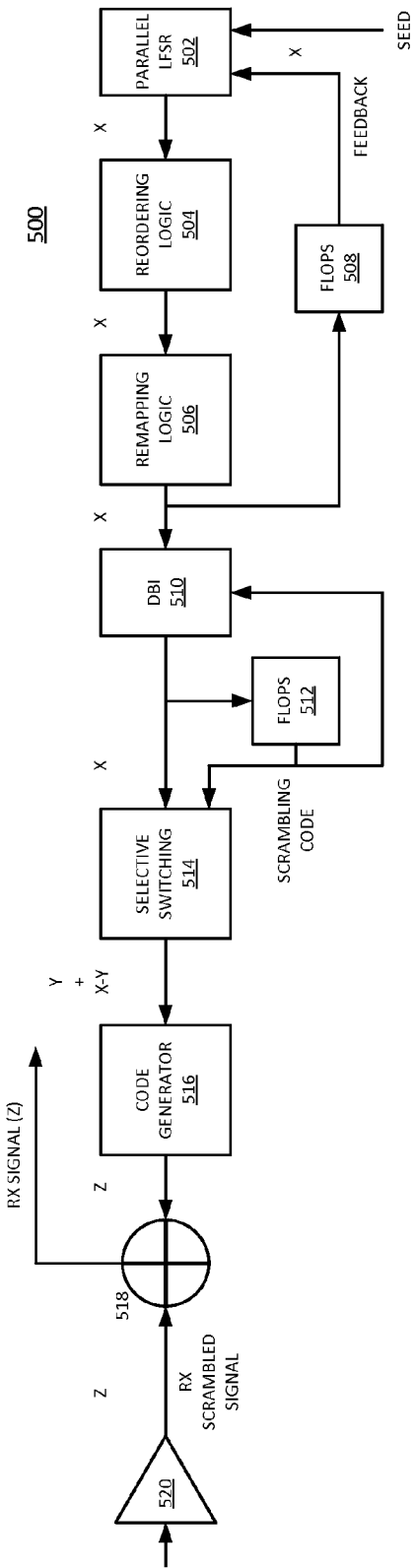
FIG. 5 is a block diagram of an embodiment of a system that supports unscrambling including nonlinear scrambling codes, selectively applied DBI, and selective code filtering.

FIG. 5 is a block diagram of an embodiment of a system that supports unscrambling including nonlinear scrambling codes, selectively applied DBI, and selective code filtering. Circuit 500 represents logic to implement a descrambler in accordance with any embodiment described herein, and can be referred to as descrambler 500. Descrambler 500 can be one example of logic within I/O controllers 220 and 240 of system 200, and control logic 116 and device control 126 of system 100. Descrambler 500 can be implemented in logic within a processor device.

The logic of descrambler 500 for generating the scrambling code will generate the same scrambling code used to scramble the received data. Without generating the same scrambling code, descrambler 500 would not be successful in unscrambling the received signal. Thus, the components of descrambler 500 for generating the scrambling code can be the same as the components of scrambler 400.

In one embodiment, descrambler 500 starts with a fixed seed (X-bit), which is the same seed that a controller or scrambler on the transmitting end will start with. In one embodiment, descrambler 500 start to generate the scrambling code with a feedback output (X-bit) received from a stage of modifying the scrambling code. In one embodiment, descrambler 500 includes parallel LFSR 502, which receives the seed value, and generates an X-bit LFSR output. LFSR 502 can be a linear transform block that takes an X-bit input and transforms it to an X-bit output by XORing various inputs together. In one embodiment, LFSR 502 provides its output to reordering logic 504. Reordering logic 504 can selectively reorder output bits from the LFSR to randomize the output, and generates an X-bit output from an X-bit input. In one embodiment, reordering logic 504 provides its output into remapping logic 506. In one embodiment, remapping logic 506 applies a nonlinear transform to the input data to generate an output. In one embodiment, remapping logic 506 utilizes (X/N) substitution boxes, where X is a multiple of N. Each substitution box can take an N-bit input and produce an N-bit nonlinear output. Remapping logic 506 generates an X-bit output. In one embodiment, descrambler 500 feeds the output of remapping logic 506 back to parallel LFSR 502 as the seed for a subsequent scrambling code. Flops 508 represent one or more logic devices such as latches that can hold the data for subsequent use. Flops 508 can include a multiple levels to queue data for use in a subsequent code but not necessarily the immediately subsequent code.

It has been found that carefully choosing LFSR 502 and a substitution box (S-Box) combination, can achieve a property referred to as avalanche, where every output bit depends on every input bit. Simpler LFSRs used by traditional scrambler designs cannot achieve avalanche. By selection of the specific operations performed by LFSR 502 and remapping logic 506 (e.g., selecting S-Box design and operation), descrambler 500 can minimize correlation and differential probabilities between the lanes and cycles. Lanes refer to parallel signal lines used to transfer the data. Cycles refer to consecutive exchange (e.g., transmit, receive) transactions. Minimizing differential probabilities between the lanes and cycles leads to a more random scrambling code that minimizes correlation between lanes and/or cycles. Similar to what is described above with reference to scrambler 400, in other embodiments, descrambler 500 can be optimized for criteria in addition to, or in place of, minimizing correlation between lanes/cycles. Thus, different S-Box implementations can configure the scrambling logic for different remapping for improving any of a number of different criteria such as correlation, noise, timing, or other criteria for the I/O interface to be scrambled.

In one embodiment, descrambler 500 includes DBI logic 510 to process the scrambling code. DBI 510 can receive the output of remapping logic 506 and compare it with the scrambling code of a previous scrambling cycle. Depending on the implementation, in one embodiment, DBI 510 optionally inverts the scrambling code bits if the number of bits that toggle is greater than a predetermined threshold. Thus, DBI 510 can improve the power used by descrambler 500 by reducing the number of toggling bits. In one embodiment, descrambler 500 includes flops 512, which represents one or more logic devices such as latches or other logic that can hold the data for subsequent use. In one embodiment, flops 512 feeds the output from DBI 510 back to DBI 510 for comparison with a subsequent scrambling code. Thus, descrambler 500 can determine if the new scrambling code has a number of bits that is greater than a threshold.

In one embodiment, descrambler 500 includes selective switching 514. In one embodiment, selective switching 514 receives the output of DBI 510 two different ways. As illustrated, selective switching 514 can be coupled to directly receive the output of DBI 510, and can be coupled to receive the output of DBI 510 via flops 512. Selective switching 514 enables descrambler 500 to switch some of the lanes or bits of the scrambling code in accordance with the scrambling operations performed, and to leave some of the lanes or bits the same as a previous cycle of the code. Flops 512 holds and provides the scrambling code of the previous cycle. Thus, selective switching 514 can generate an output based on a current cycle or iteration of a scrambling code as generated via logic 502, 504, 506, and 510, and selectively on the previous scrambling code.

For example, in one embodiment, selective switching 514 selects Y bits out of the X bits of the scrambling code. The Y bits will take on the new code as provided by the direct coupling to DBI 510. Selective switching causes the remaining X minus Y bits (X-Y) to maintain their bit values based on the previous cycle scrambling code. In one embodiment, selective switching 514 can select a different group of Y bits every cycle, or every fixed number of cycles. When selective switching 514 selects a different group of Y bits on each cycle, the average output is updated every Y/X cycles instead of every cycle. Selective switching 514 can provide improved tradeoff between scrambling effectiveness and power consumption while still maintaining a constant switching rate for low dI/dT. In one embodiment, selective switching 514 selects Y switching lanes equally spaced through the X lanes, which can spread the switching in space as well as in time. Thus, selective switching 514 can generate both Y bits that are scrambled and X-Y bits that are held constant from the previous cycle for a total output of X bits. It will be understood that Y is a number less than X, but could be more or less than X/2.

Code generator 516 generates the final scrambling code or the resulting modified scrambling code. Code generator 516 provides the modified scrambling code to combiner 518 to apply to the RX signal to unscramble the signal. Descrambler 500 receives the RX signal via receive hardware, represented by block 520. The incoming signal is a received scrambled signal, which descrambler 500 receives into combiner 518. Combiner 518 applies the modified scrambling code to the scrambled RX signal to unscramble it into the RX signal. In one embodiment, the RX signal includes only data scrambled, and address and/or command is not scrambled. In one embodiment, the RX scrambled signal includes command and/or address information in addition to data information, all scrambled. It will be understood that data in this context refers to a signal to be sent over a data bus, which can be separate from a command/address (C/A) bus that provides information indicating what operations to perform on what locations of memory.

The RX scrambled signal and the unscrambled RX signal are Z bits in width, where Z can be a number different from X. X and Z can be equal. In one embodiment, Z is greater than X, and descrambler 500 can unscramble the Z-bit input signal with an X-bit scrambling code. In one embodiment, Z is less than X, and descrambler 500 can unscramble a Z-bit input signal that has fewer lanes than the scrambling code. Combiner 518 generates RX unscrambled signal (a Z-bit signal) to process in a receiving device of which descrambler 500 is a part. In one embodiment, descrambler 500 applies the X bit scrambling code to scramble the Z bits of RX scrambled signal, where Z is greater than X, or the received signal has more lanes than the scrambling code (Z lanes>X lanes). For example, combiner 518 can split the X bit scrambling code into two segments of (X/2) bits each, and employ a 2-input XOR to create various combinations of the bits. In such an example, it is possible to descramble $(X/2)^2$ lanes (e.g., a 16-bit code can cover 64 lanes (16/2=8; 8*8=64). The application of the scrambling code by splitting the scrambling code can reduce the overhead associated with the scrambling logic for wide buses. Other combinations are obviously possible using different numbers of lanes, and different sizes for XOR logic and/or S-Box sizes or other remapping logic.

Figure 6:
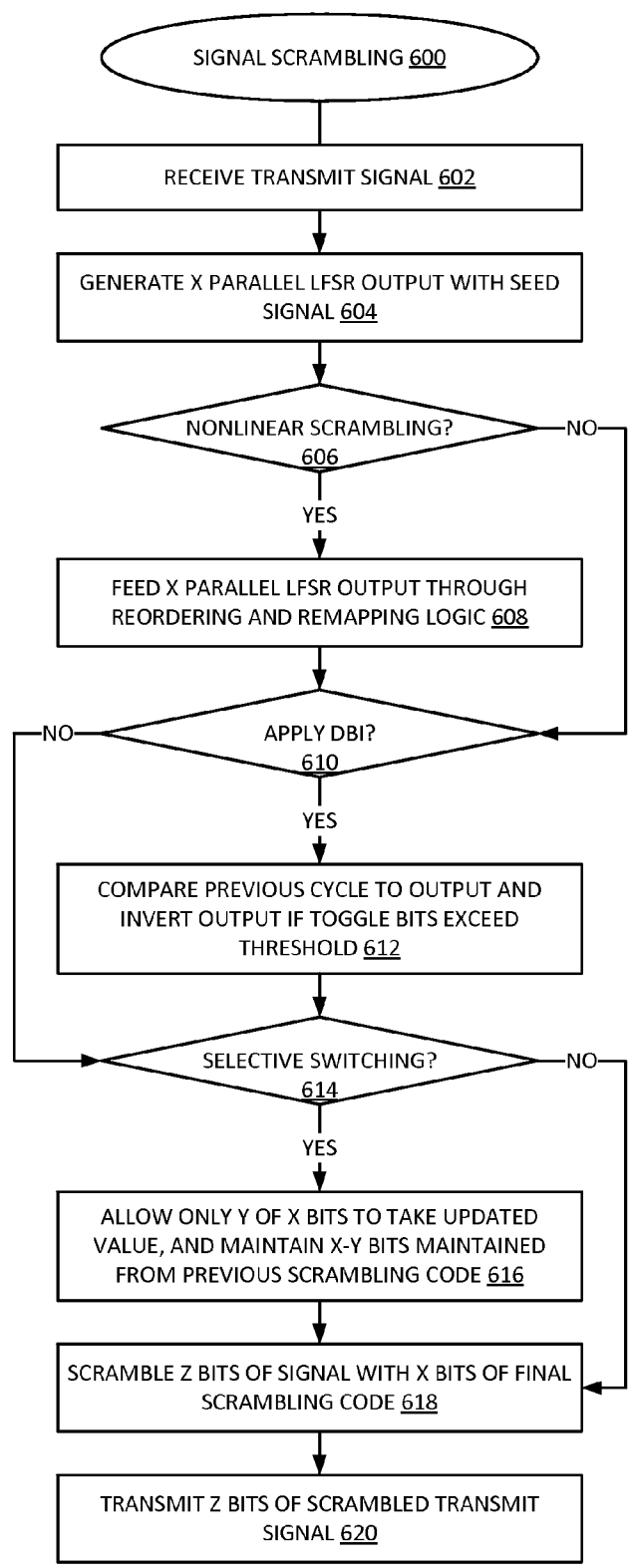
FIG. 6 is a flow diagram of an embodiment of a process for implementing scrambling including providing nonlinear scrambling codes, or selectively applied DBI, or selective code filtering.

FIG. 6 is a flow diagram of an embodiment of a process for implementing scrambling including providing nonlinear scrambling codes, or selectively applied DBI, or selective code filtering. Signal scrambling process 600 can be executed by any scrambler that scrambles a signal for transmitting, in accordance with any embodiment described herein. A scrambler receives a signal to be transmitted or a TX signal, 602. The scrambler generates a scrambling code to combine with or apply to the TX signal. The scrambler starts generation of the scrambling code by generating a linear scrambling code. In one embodiment, the scrambler generates X parallel LFSR output based on a seed signal, to result in an X-bit scrambling code, 604. The seed signal can be a fixed signal, an input signal, or a feedback signal.

In one embodiment, the scrambler modifies the scrambling code with nonlinear scrambling. If the scrambler is to apply nonlinear scrambling, 606 YES branch, in one embodiment, the scrambler feeds the X parallel LFSR outputs through reordering and remapping logic, 608. The remapping can include substitution box transformations. If the scrambler is not to apply nonlinear scrambling, 606 NO branch, the scrambler can forward the scrambling code without the application of nonlinear techniques and continue with the scrambling code generation at 610.

In one embodiment, the scrambler modifies the scrambling code with an application of DBI. If the scrambler is to apply DBI, 610 YES branch, in one embodiment, the scrambler compares the previous cycle scrambling code to the output or the current scrambling code and inverts the current scrambling code output if the number of bits toggled exceeds a threshold, 612. If the scrambler is not to apply DBI, 610 NO branch, the scrambler can forward the scrambling code without the application of DBI and continue with the scrambling code generation at 614.

In one embodiment, the scrambler modifies the scrambling code with selective switching. In one embodiment, if the scrambler is to apply selective switching, 614 YES branch, the scrambler allows only Y of X bits to take an updated value. The scrambler will maintain the other X-Y bits at their value in accordance with the previous scrambling code, 616. If the scrambler is not to apply selective switching, 614 NO branch, the scrambler can forward the scrambling code without the application of selective switching and continue with the scrambling code generation at 618.

After generating a scrambling code, the scrambler scrambles Z bits of TX signal with X bits of the final scrambling code, 618. The final scrambling code is the LFSR output code modified by one or more of the scrambling techniques described with respect to process 600 at 606, 608, 610, 612, 614, 616. The I/O control that includes the scrambler outputs or transmits the Z bits of scrambled transmit signal over an interconnection, 620.

Figure 7:
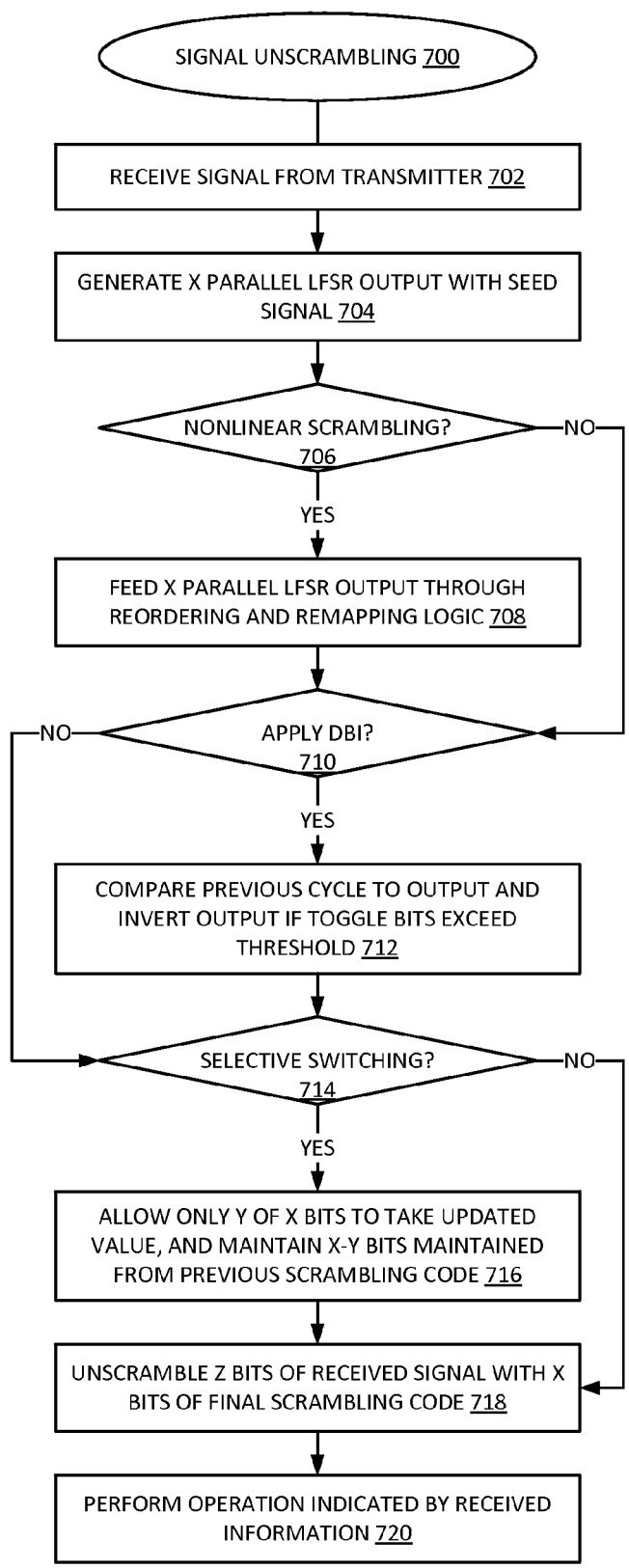
FIG. 7 is a flow diagram of an embodiment of a process for implementing unscrambling including providing nonlinear scrambling codes, or selectively applied DBI, or selective code filtering.

FIG. 7 is a flow diagram of an embodiment of a process for implementing unscrambling including providing nonlinear scrambling codes, or selectively applied DBI, or selective code filtering. Signal unscrambling process 700 can be executed by any descrambler that unscrambles a received signal for processing, in accordance with any embodiment described herein. A descrambler receives a signal to be unscrambled or a RX signal from a transmitter device, 702. The descrambler generates a scrambling code to combine with or apply to the RX signal. The descrambler generates the same scrambling code to apply to the RX signal that was applied by the scrambler to the TX signal. The descrambler starts generation of the scrambling code by generating a linear scrambling code. In one embodiment, the descrambler generates X parallel LFSR output based on a seed signal, to result in an X-bit scrambling code, 704. The seed signal can be a fixed signal, an input signal, or a feedback signal.

In one embodiment, the descrambler modifies the scrambling code with nonlinear scrambling. If the scrambler is to apply nonlinear scrambling, 706 YES branch, in one embodiment, the descrambler feeds the X parallel LFSR outputs through reordering and remapping logic, 708. The remapping can include substitution box transformations. If the descrambler is not to apply nonlinear scrambling, 706 NO branch, the scrambler can forward the scrambling code without the application of nonlinear techniques and continue with the scrambling code generation at 710.

In one embodiment, the descrambler modifies the scrambling code with an application of DBI. If the scrambler is to apply DBI, 710 YES branch, in one embodiment, the descrambler compares the previous cycle scrambling code to the output or the current scrambling code and inverts the current scrambling code output if the number of bits toggled exceeds a threshold, 712. If the descrambler is not to apply DBI, 710 NO branch, the descrambler can forward the scrambling code without the application of DBI and continue with the scrambling code generation at 714.

In one embodiment, the descrambler modifies the scrambling code with selective switching. In one embodiment, if the descrambler is to apply selective switching, 714 YES branch, the descrambler allows only Y of X bits to take an updated value. The descrambler will maintain the other X-Y bits at their value in accordance with the previous scrambling code, 716. If the descrambler is not to apply selective switching, 714 NO branch, the descrambler can forward the scrambling code without the application of selective switching and continue with the scrambling code generation at 718.

After generating a scrambling code, the descrambler unscrambles the Z bits of the RX signal with X bits of the final scrambling code, 718. The final scrambling code is the LFSR output code modified by one or more of the scrambling techniques described with respect to process 700 at 706, 708, 710, 712, 714, 716. The I/O control that includes the descrambler decodes or otherwise interprets the communication provided in the unscrambled RX signal. The system can perform the operations indicated by the received information, 720.

Figure 8:
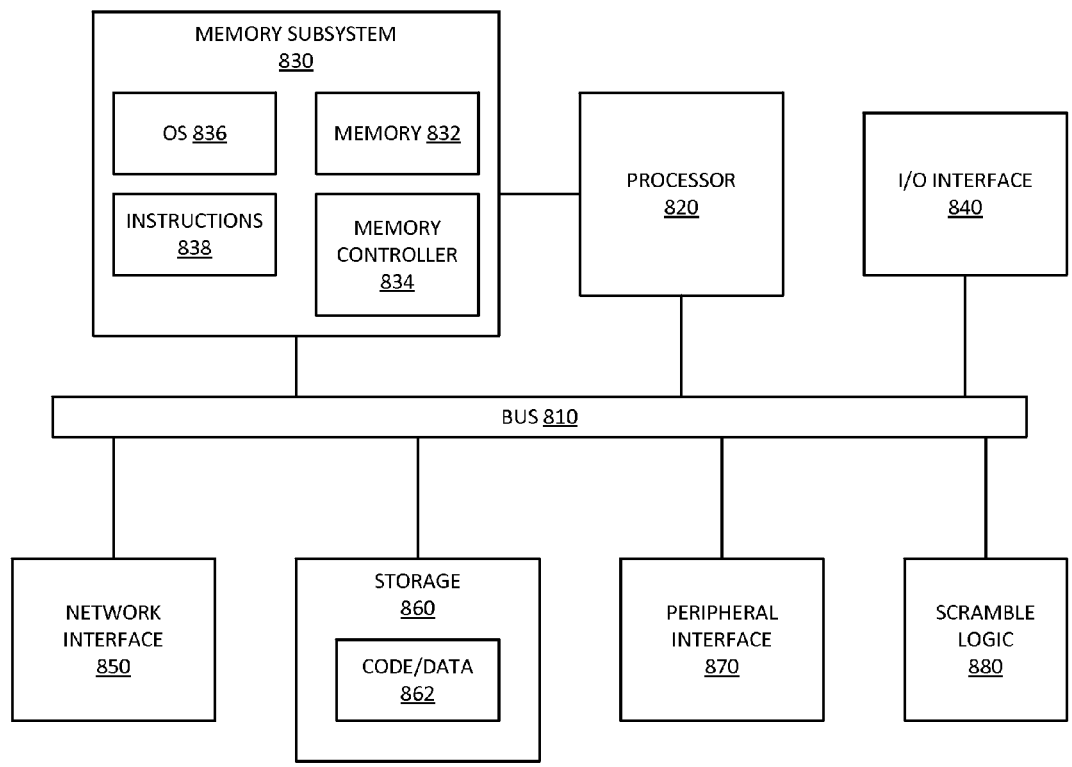
FIG. 8 is a block diagram of an embodiment of a computing system in which scrambling with improved scrambling codes can be implemented.

FIG. 8 is a block diagram of an embodiment of a computing system in which scrambling with improved scrambling codes can be implemented. System 800 represents a computing device in accordance with any embodiment described herein, and can be a laptop computer, a desktop computer, a server, a gaming or entertainment control system, a scanner, copier, printer, routing or switching device, or other electronic device. System 800 includes processor 820, which provides processing, operation management, and execution of instructions for system 800. Processor 820 can include any type of microprocessor, central processing unit (CPU), processing core, or other processing hardware to provide processing for system 800. Processor 820 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 830 represents the main memory of system 800, and provides temporary storage for code to be executed by processor 820, or data values to be used in executing a routine. Memory subsystem 830 can include one or more memory devices such as read-only memory (ROM), flash memory, one or more varieties of random access memory (RAM), or other memory devices, or a combination of such devices. Memory subsystem 830 stores and hosts, among other things, operating system (OS) 836 to provide a software platform for execution of instructions in system 800. Additionally, other instructions 838 are stored and executed from memory subsystem 830 to provide the logic and the processing of system 800. OS 836 and instructions 838 are executed by processor 820. Memory subsystem 830 includes memory device 832 where it stores data, instructions, programs, or other items. In one embodiment, memory subsystem includes memory controller 834, which is a memory controller to generate and issue commands to memory device 832. It will be understood that memory controller 834 could be a physical part of processor 820.

Processor 820 and memory subsystem 830 are coupled to bus/bus system 810. Bus 810 is an abstraction that represents any one or more separate physical buses, communication lines/interfaces, and/or point-to-point connections, connected by appropriate bridges, adapters, and/or controllers. Therefore, bus 810 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 810 can also correspond to interfaces in network interface 850.

System 800 also includes one or more input/output (I/O) interface(s) 840, network interface 850, one or more internal mass storage device(s) 860, and peripheral interface 870 coupled to bus 810. I/O interface 840 can include one or more interface components through which a user interacts with system 800 (e.g., video, audio, and/or alphanumeric interfacing). Network interface 850 provides system 800 the ability to communicate with remote devices (e.g., servers, other computing devices) over one or more networks. Network interface 850 can include an Ethernet adapter, wireless interconnection components, USB (universal serial bus), or other wired or wireless standards-based or proprietary interfaces.

Storage 860 can be or include any conventional medium for storing large amounts of data in a nonvolatile manner, such as one or more magnetic, solid state, or optical based disks, or a combination. Storage 860 holds code or instructions and data 862 in a persistent state (i.e., the value is retained despite interruption of power to system 800). Storage 860 can be generically considered to be a "memory," although memory 830 is the executing or operating memory to provide instructions to processor 820. Whereas storage 860 is nonvolatile, memory 830 can include volatile memory (i.e., the value or state of the data is indeterminate if power is interrupted to system 800).

Peripheral interface 870 can include any hardware interface not specifically mentioned above. Peripherals refer generally to devices that connect dependently to system 800. A dependent connection is one where system 800 provides the software and/or hardware platform on which operation executes, and with which a user interacts.

In one embodiment, system 800 includes scramble logic 880. Scramble logic 880 represents I/O controller logic in accordance with any embodiment described herein to generate scrambled signals for transmit and/or to unscramble received signals. Scramble logic 880 can be part of any of the components of system 800 that supports inter-device communication with scrambling. For example, memory 832 could be configured to communicate with memory controller 834 via an interconnection that supports scrambling. Thus, both devices could include scrambling logic 880. Scrambling logic 880 generates a scrambling code with a linear-based technique, and modifies the code with one or more additional scrambling operations. The operations can include, but are not limited to, applying nonlinear techniques to the scrambling code, applying DBI to the scrambling code, or applying selective switching to maintain some of the code the same as previous and update other bits of the code, or a combination of these. In each case, the final scrambling code (i.e., the modified scrambling code) may provide for fewer than 50% toggles of the generated scrambling code relative to the scrambling code of the previous cycle.

Figure 9:
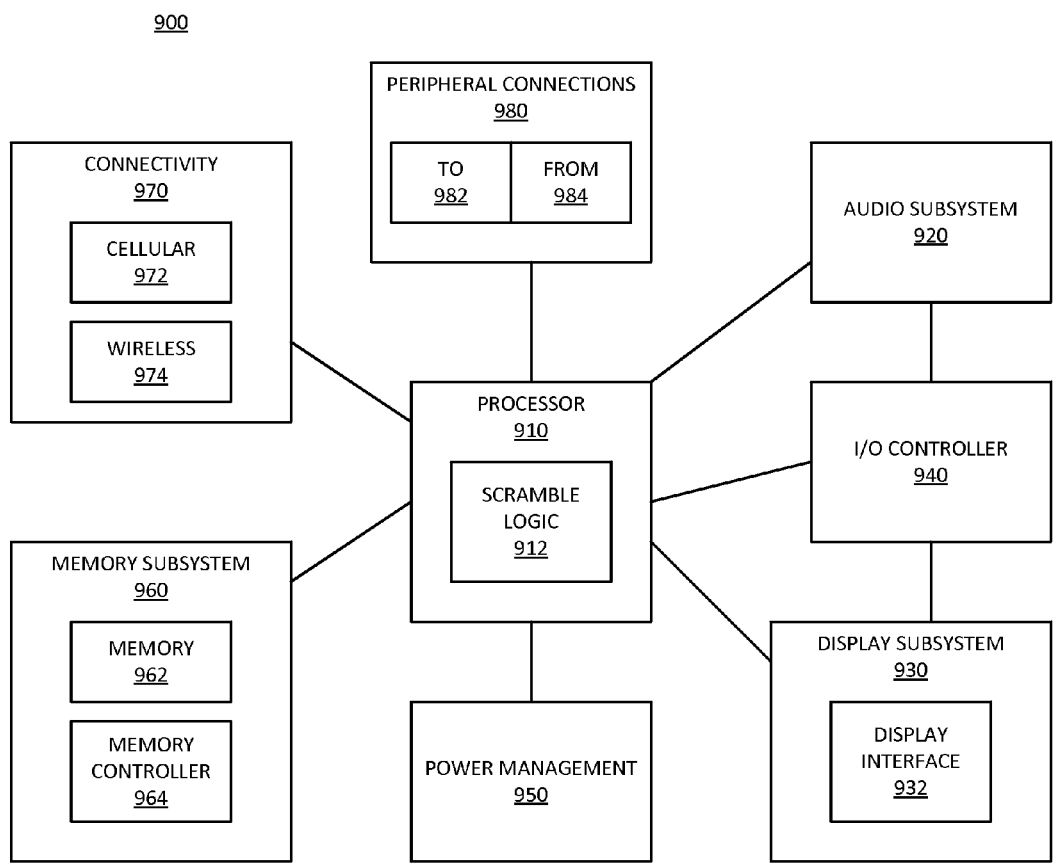
FIG. 9 is a block diagram of an embodiment of a mobile device in which scrambling with improved scrambling codes can be implemented.

FIG. 9 is a block diagram of an embodiment of a mobile device in which scrambling with improved scrambling codes can be implemented. Device 900 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 900.

Device 900 includes processor 910, which performs the primary processing operations of device 900. Processor 910 can include one or more physical devices, such as microprocessors, application processors, microcontrollers, programmable logic devices, or other processing means. The processing operations performed by processor 910 include the execution of an operating platform or operating system on which applications and/or device functions are executed. The processing operations include operations related to I/O (input/output) with a human user or with other devices, operations related to power management, and/or operations related to connecting device 900 to another device. The processing operations can also include operations related to audio I/O and/or display I/O.

In one embodiment, device 900 includes audio subsystem 920, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 900, or connected to device 900. In one embodiment, a user interacts with device 900 by providing audio commands that are received and processed by processor 910.

Display subsystem 930 represents hardware (e.g., display devices) and software (e.g., drivers) components that provide a visual and/or tactile display for a user to interact with the computing device. Display subsystem 930 includes display interface 932, which includes the particular screen or hardware device used to provide a display to a user. In one embodiment, display interface 932 includes logic separate from processor 910 to perform at least some processing related to the display. In one embodiment, display subsystem 930 includes a touchscreen device that provides both output and input to a user. In one embodiment, display subsystem 930 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 940 represents hardware devices and software components related to interaction with a user. I/O controller 940 can operate to manage hardware that is part of audio subsystem 920 and/or display subsystem 930. Additionally, I/O controller 940 illustrates a connection point for additional devices that connect to device 900 through which a user might interact with the system. For example, devices that can be attached to device 900 might include microphone devices, speaker or stereo systems, video systems or other display device, keyboard or keypad devices, or other I/O devices for use with specific applications such as card readers or other devices.

As mentioned above, I/O controller 940 can interact with audio subsystem 920 and/or display subsystem 930. For example, input through a microphone or other audio device can provide input or commands for one or more applications or functions of device 900. Additionally, audio output can be provided instead of or in addition to display output. In another example, if display subsystem includes a touchscreen, the display device also acts as an input device, which can be at least partially managed by I/O controller 940. There can also be additional buttons or switches on device 900 to provide I/O functions managed by I/O controller 940.

In one embodiment, I/O controller 940 manages devices such as accelerometers, cameras, light sensors or other environmental sensors, gyroscopes, global positioning system (GPS), or other hardware that can be included in device 900. The input can be part of direct user interaction, as well as providing environmental input to the system to influence its operations (such as filtering for noise, adjusting displays for brightness detection, applying a flash for a camera, or other features). In one embodiment, device 900 includes power management 950 that manages battery power usage, charging of the battery, and features related to power saving operation.

Memory subsystem 960 includes memory device(s) 962 for storing information in device 900. Memory subsystem 960 can include nonvolatile (state does not change if power to the memory device is interrupted) and/or volatile (state is indeterminate if power to the memory device is interrupted) memory devices. Memory 960 can store application data, user data, music, photos, documents, or other data, as well as system data (whether long-term or temporary) related to the execution of the applications and functions of system 900. In one embodiment, memory subsystem 960 includes memory controller 964 (which could also be considered part of the control of system 900, and could potentially be considered part of processor 910). Memory controller 964 includes a scheduler to generate and issue commands to memory device 962.

Connectivity 970 includes hardware devices (e.g., wireless and/or wired connectors and communication hardware) and software components (e.g., drivers, protocol stacks) to enable device 900 to communicate with external devices. The external device could be separate devices, such as other computing devices, wireless access points or base stations, as well as peripherals such as headsets, printers, or other devices.

Connectivity 970 can include multiple different types of connectivity. To generalize, device 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 974 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 980 include hardware interfaces and connectors, as well as software components (e.g., drivers, protocol stacks) to make peripheral connections. It will be understood that device 900 could both be a peripheral device ("to" 982) to other computing devices, as well as have peripheral devices ("from" 984) connected to it. Device 900 commonly has a "docking" connector to connect to other computing devices for purposes such as managing (e.g., downloading and/or uploading, changing, synchronizing) content on device 900. Additionally, a docking connector can allow device 900 to connect to certain peripherals that allow device 900 to control content output, for example, to audiovisual or other systems.

In addition to a proprietary docking connector or other proprietary connection hardware, device 900 can make peripheral connections 980 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 900 includes scramble logic 912. Scramble logic 912 represents I/O controller logic in accordance with any embodiment described herein to generate scrambled signals for transmit and/or to unscramble received signals. Scramble logic 912 can be part of any of the components of system 900 that supports inter-device communication with scrambling. For example, memory 962 could be configured to communicate with memory controller 964 via an interconnection that supports scrambling. Thus, both devices could include scrambling logic 912. Scrambling logic 912 generates a scrambling code with a linear-based technique, and modifies the code with one or more additional scrambling operations. The operations can include, but are not limited to, applying nonlinear techniques to the scrambling code, applying DBI to the scrambling code, or applying selective switching to maintain some of the code the same as previous and update other bits of the code, or a combination of these. In each case, the final scrambling code (i.e., the modified scrambling code) may provide for fewer than 50% toggles of the generated scrambling code relative to the scrambling code of the previous cycle.

In one aspect, a method for signal scrambling includes: generating a linear feedback scrambling code, the scrambling code including X bits; applying a second scrambling operation to selectively change bits of the scrambling code to generate a modified scrambling code causing fewer than half of the scrambled output bits to be toggled with respect to a previous scrambled output; and applying the modified scrambling code to a detected signal for exchange between a host controller and a memory device to generate an output.

In one embodiment, generating the linear feedback scrambling code comprises: generating a linear feedback shift register (LFSR) code to the signal. In one embodiment, applying the second scrambling operation further comprises: applying a nonlinear scrambling operation. In one embodiment, applying the nonlinear scrambling operation comprises: performing a bit remapping of the scrambling code to selectively change some of the X bits. In one embodiment, applying the second scrambling operation further comprises: applying dynamic bus inversion (DBI) to the scrambling code. In one embodiment, applying the second scrambling operation further comprises: applying selective switching of selected bits of the scrambling code. In one embodiment, applying selective switching of the selected bits comprises: toggling either even or odd lanes of the scrambling code. In one embodiment, applying the second scrambling operation to the scrambling code further comprises: applying a combination of two or more of a nonlinear scrambling operation, selective switching of selected bits of the linear scrambling output, and DBI. In one embodiment, applying the second scrambling operation to the scrambling code further comprises: consecutively applying one or more second scrambling operations to a single scrambling code to generate multiple consecutive modified scrambling codes. In one embodiment, applying the modified scrambling code to the detected signal comprises: applying the modified scrambling code to a detected signal including command and address information. In one embodiment, applying the modified scrambling code to the detected signal further comprises: splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having more than X bits. In one embodiment, splitting the X-bit scrambling code into N subsets of scrambling codes further comprises: splitting the X-bit scrambling code into two (X/2)-bit scrambling codes and applying the two (X/2)-bit scrambling codes to multiple XOR blocks to apply the scrambling code to a signal having more than X bits. In one embodiment, applying the modified scrambling code to the detected signal further comprises: splitting the X-bit scrambling code into multiple scrambling code segments each having fewer than X bits, wherein at least two of the scrambling code segments have different numbers of bits, and applying the multiple scrambling code segments to multiple XOR blocks to apply the scrambling code to the detected signal. In one embodiment, applying the modified scrambling code to the detected signal further comprises: splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having fewer than X bits. In one embodiment, the memory device comprises a nonvolatile memory device. In one embodiment, the memory device comprises a volatile memory device. In one embodiment, applying the modified scrambling code to the detected signal comprises: applying the modified scrambling code to scramble a signal to transmit between the host controller and the memory device. In one embodiment, applying the modified scrambling code to scramble the signal to transmit comprises: applying the modified scrambling code at the host controller to scramble the signal to be transmitted in parallel to multiple memory devices coupled to the host controller. In one embodiment, applying the modified scrambling code to the detected signal comprises: applying the modified scrambling code to unscramble a signal transmitted between the host controller and the memory device.

In one aspect, a scrambler circuit includes: a linear feedback shift register (LFSR) to generate an X-bit scrambling code; a scrambling logic block to selectively toggle bits of the X-bit scrambling code to generate a modified scrambling code causing fewer than half of the scrambled output bits to be toggled with respect to a previous scrambled output; and a signal combining circuit to apply the modified scrambling code to scramble a Z-bit transmit signal to output to a receiving device, where Z is equal to or greater than X.

In one embodiment, the scrambling logic block is to apply a nonlinear scrambling operation. In one embodiment, the scrambling logic block is to perform a bit remapping of the scrambling code to selectively change some of the X bits. In one embodiment, the scrambling logic block is to apply dynamic bus inversion (DBI) to the scrambling code. In one embodiment, the scrambling logic block is to apply selective switching of selected bits of the scrambling code. In one embodiment, the scrambling logic block is to toggle either even or odd lanes of the scrambling code. In one embodiment, the scrambling logic block is to apply a combination of two or more of a nonlinear scrambling operation, selective switching of selected bits of the linear scrambling output, and DBI. In one embodiment, the scrambling logic block is to consecutively applying one or more second scrambling operations to a single scrambling code to generate multiple consecutive modified scrambling codes. In one embodiment, the scrambling logic block is to apply the modified scrambling code to a signal including command and address information. In one embodiment, wherein Z is greater than X, and wherein the signal combining circuit is to apply the modified scrambling code by splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having more than X bits. In one embodiment, the signal combining circuit is to apply the modified scrambling code by splitting the X-bit scrambling code into two (X/2)-bit scrambling codes and applying the two (X/2)-bit scrambling codes to multiple XOR blocks to apply the scrambling code to a signal having more than X bits. In one embodiment, the signal combining circuit is to apply the modified scrambling code by splitting the X-bit scrambling code into multiple scrambling code segments each having fewer than X bits, wherein at least two of the scrambling code segments have different numbers of bits, and applying the multiple scrambling code segments to multiple XOR blocks to apply the scrambling code to the output signal. In one embodiment, wherein Z is less than X, and wherein the signal combining circuit is to apply the modified scrambling code by splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having fewer than X bits. In one embodiment, the memory device comprises a nonvolatile memory device. In one embodiment, the memory device comprises a volatile memory device. In one embodiment, the signal combining circuit is to apply the modified scrambling code including applying the modified scrambling code to scramble a signal to transmit between the host controller and the memory device. In one embodiment, the signal combining circuit is to apply the modified scrambling code including applying the modified scrambling code at the host controller to scramble the signal to be transmitted in parallel to multiple memory devices coupled to the host controller. In one embodiment, the signal combining circuit is to apply the modified scrambling code including applying the modified scrambling code to scramble a signal to be transmitted from the memory device to the memory controller.

In one aspect, a descrambler circuit includes: a linear feedback shift register (LFSR) to generate an X-bit scrambling code; a scrambling logic block to selectively toggle bits of the scrambling code to generate a modified scrambling code causing fewer than half of the scrambled output bits to be toggled with respect to a previous scrambled output; and a signal combining circuit to apply the modified scrambling code to unscramble a Z-bit received signal received from a transmitting device, where Z is equal to or greater than X.

In one embodiment, the scrambling logic block is to apply a nonlinear scrambling operation. In one embodiment, the scrambling logic block is to perform a bit remapping of the scrambling code to selectively change some of the X bits. In one embodiment, the scrambling logic block is to apply dynamic bus inversion (DBI) to the scrambling code. In one embodiment, the scrambling logic block is to apply selective switching of selected bits of the scrambling code. In one embodiment, the scrambling logic block is to toggle either even or odd lanes of the scrambling code. In one embodiment, the scrambling logic block is to apply a combination of two or more of a nonlinear scrambling operation, selective switching of selected bits of the linear scrambling output, and DBI. In one embodiment, the scrambling logic block is to consecutively applying one or more second scrambling operations to a single scrambling code to generate multiple consecutive modified scrambling codes. In one embodiment, the scrambling logic block is to apply the modified scrambling code to a signal including command and address information. In one embodiment, wherein Z is greater than X, and wherein the signal combining circuit is to apply the modified scrambling code by splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having more than X bits. In one embodiment, the signal combining circuit is to apply the modified scrambling code by splitting the X-bit scrambling code into two (X/2)-bit scrambling codes and applying the two (X/2)-bit scrambling codes to multiple XOR blocks to apply the scrambling code to a signal having more than X bits. In one embodiment, the signal combining circuit is to apply the modified scrambling code by splitting the X-bit scrambling code into multiple scrambling code segments each having fewer than X bits, wherein at least two of the scrambling code segments have different numbers of bits, and applying the multiple scrambling code segments to multiple XOR blocks to apply the scrambling code to the received signal. In one embodiment, wherein Z is less than X, and wherein the signal combining circuit is to apply the modified scrambling code by splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having fewer than X bits. In one embodiment, the memory device comprises a nonvolatile memory device. In one embodiment, the memory device comprises a volatile memory device. In one embodiment, the signal combining circuit is to apply the modified scrambling code including applying the modified scrambling code to unscramble a signal received exchanged between the host controller and the memory device. In one embodiment, the signal combining circuit is to apply the modified scrambling code including applying the modified scrambling code at the host controller to unscramble the received signal scrambled at the memory device. In one embodiment, the signal combining circuit is to apply the modified scrambling code including applying the modified scrambling code to unscramble a received signal at the memory device.

In one aspect, an electronic device with a memory subsystem includes: a memory controller having a scrambler circuit including a linear feedback shift register (LFSR) to generate an X-bit scrambling code at the memory controller; a scrambling logic block to selectively toggle bits of the scrambling code to generate a modified scrambling code causing fewer than half of the scrambled output bits to be toggled with respect to a previous scrambled output from the scrambler circuit; and a signal combining circuit to apply the modified scrambling code to scramble a Z-bit transmit signal to output to a memory device, where Z is equal to or greater than X; an input/output (I/O) interface coupled to the memory controller; and a memory device coupled to the memory controller over the I/O interface, the memory device having a scrambler circuit including a linear feedback shift register (LFSR) to generate the X-bit scrambling code at the memory device; a scrambling logic block to selectively toggle bits of the X-bit scrambling code to generate a modified scrambling code causing fewer than half of the scrambled output bits to be toggled with respect to a previous scrambled output; a signal combining circuit to apply the modified scrambling code to unscramble the Z-bit received signal received from the memory controller; and a touchscreen display coupled to generate a display based on data accessed from the memory device. Any embodiment described with reference to the scrambler can apply to the electronic device. Any embodiment described with reference to the descrambler can apply to the electronic device.

In one aspect, an article of manufacture comprising a computer readable storage medium having content stored thereon, which when accessed causes a computing device to perform operations for signal scrambling, including: generating a linear feedback scrambling code, the scrambling code including X bits; applying a second scrambling operation to selectively change bits of the scrambling code to generate a modified scrambling code causing fewer than half of the scrambled output bits to be toggled with respect to a previous scrambled output; and applying the modified scrambling code to a detected signal for exchange between a host controller and a memory device to generate an output. Any embodiment described with reference to the method for signal scrambling can also apply to the article of manufacture.

In one aspect, an apparatus for signal scrambling, includes: means for generating a linear feedback scrambling code, the scrambling code including X bits; means for applying a second scrambling operation to selectively change bits of the scrambling code to generate a modified scrambling code causing fewer than half of the scrambled output bits to be toggled with respect to a previous scrambled output; and means for applying the modified scrambling code to a detected signal for exchange between a host controller and a memory device to generate an output. Any embodiment described with reference to the method for signal scrambling can also apply to the apparatus.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for signal scrambling, comprising:
generating a linear feedback scrambling code
selecting one or more bits of a previously generated scrambling code for modification, wherein the one or more bits correspond to one or more predetermined lanes, wherein the one or more predetermined lanes include fewer than all lanes over which scrambled data is to be transmitted;
modifying the one or more bits of the previously generated scrambling code to values of corresponding bits of the linear feedback scrambling code to generate a modified scrambling code; and
applying the modified scrambling code to a detected signal for exchange between a host controller and a memory device to generate an output.

2. The method of claim 1, wherein generating the linear feedback scrambling code comprises:
generating a linear feedback shift register (LFSR) code to the signal.

3. The method of claim 1, wherein modifying the one or more bits of the previously generated scrambling code to values of corresponding bits of the linear feedback scrambling code further comprises:
applying a nonlinear scrambling operation to generate the modified scrambling code.

4. The method of claim 3, wherein applying the nonlinear scrambling operation comprises:
performing a bit remapping of the previously generated scrambling code to selectively change some of the one or more bits.

5. The method of claim 1, wherein modifying the one or more bits of the previously generated scrambling code to values of corresponding bits of the linear feedback scrambling code further comprises:
applying dynamic bus inversion (DBI) to the previously generated scrambling code to generate the modified scrambling code.

6. The method of claim 1, wherein modifying the one or more bits of the previously generated scrambling code comprises:
toggling either even or odd lanes of the previously generated scrambling code based on the corresponding bits of the linear feedback scrambling code to generate the modified scrambling code.

7. The method of claim 1, further comprising:
applying a combination of two or more of a nonlinear scrambling operation to the previously generated scrambling code, a selective switching of selected bits of the previously generated scrambling code, and a dynamic bus inversion (DBI) to the previously generated scrambling code in order to generate the modified scrambling code.

8. The method of claim 1, further comprising:
consecutively applying one or more second scrambling operations to a single scrambling code to generate multiple consecutive modified scrambling codes.

9. The method of claim 1, wherein applying the modified scrambling code to the detected signal comprises:
applying the modified scrambling code to a detected signal including command and address information.

10. The method of claim 1, wherein:
the linear feedback scrambling code includes X bits; and
wherein applying the modified scrambling code to the detected signal further comprises:
splitting the previously generated scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having more than X bits.

11. The method of claim 10, wherein splitting the previously generated scrambling code into N subsets of scrambling codes further comprises:
splitting the previously generated scrambling code into two (X/2)-bit scrambling codes and applying the two (X/2)-bit scrambling codes to multiple XOR blocks to apply the modified scrambling code to a signal having more than X bits.

12. The method of claim 1, wherein the memory device comprises a nonvolatile memory device.

13. The method of claim 1, wherein applying the modified scrambling code to the detected signal comprises:
applying the modified scrambling code to scramble a signal to transmit between the host controller and the memory device.

14. The method of claim 13, applying the modified scrambling code to scramble the signal to transmit comprises:
applying the modified scrambling code at the host controller to scramble the signal to be transmitted in parallel to multiple memory devices coupled to the host controller.

15. The method of claim 1, wherein applying the modified scrambling code to the detected signal comprises:
applying the modified scrambling code to unscramble a signal transmitted between the host controller and the memory device.

16. The method of claim 1, further comprising:
selecting different bits for modification every fixed number of cycles;
modifying the selected bits of the previously generated scrambling code with corresponding bits of the linear feedback scrambling code to generate the modified scrambling code.

17. The method of claim 1, wherein the one or more predetermined lanes corresponding to the modified one or more bits comprise less than or equal to half of all lanes over which data scrambled with the modified scrambling code is to be transmitted.

18. The method of claim 1, further comprising:
maintaining values of unselected bits of the previously generated scrambling code in the modified scrambling code.

19. The method of claim 1, wherein selecting the one or more bits of the previously generated scrambling code comprises: selecting the one or more predetermined lanes.

20. A scrambler circuit, comprising:
a linear feedback shift register (LFSR) to generate an X-bit scrambling code;
a scrambling logic block to:
select one or more bits of a previously generated scrambling code for modification, wherein the one or more bits correspond to one or more lanes over which scrambled data is to be transmitted, and
modify the one or more bits of the previously generated scrambling code to values of corresponding bits of the X-bit scrambling code to generate a modified scrambling code, wherein the one or more lanes include fewer than all lanes over which data scrambled with the modified scrambling code is to be transmitted; and
a signal combining circuit to apply the modified scrambling code to scramble a Z-bit transmit signal to output to a receiving device, where Z is equal to or greater than X.

21. The scrambler circuit of claim 20, wherein the scrambling logic block is to apply a nonlinear scrambling operation to the previously generated scrambling code, or apply dynamic bus inversion (DBI) to the previously generated scrambling code, or apply selective switching of selected bits of the previously generated scrambling code, or apply a combination of these to the previously generated scrambling code.

22. The scrambler circuit of claim 20, wherein Z is greater than X, and wherein the signal combining circuit is to apply the modified scrambling code by
splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having more than X bits.

23. A descrambler circuit, comprising:
a linear feedback shift register (LFSR) to generate an X-bit scrambling code;
a scrambling logic block to
select one or more bits of a previously generated scrambling code for modification, wherein the one or more bits correspond to one or more lanes over which scrambled data is to be transmitted, and
modify the one or more bits of the previously generated scrambling code to values of corresponding bits of the X-bit scrambling code to generate a modified scrambling code, wherein the one or more lanes include fewer than all lanes over which data scrambled with the modified scrambling code is to be transmitted; and
a signal combining circuit to apply the modified scrambling code to unscramble a Z-bit received signal received from a transmitting device, where Z is equal to or greater than X.

24. The descrambler circuit of claim 23, wherein the scrambling logic block is to apply a nonlinear scrambling operation to the previously generated scrambling code, or apply dynamic bus inversion (DBI) to the previously generated scrambling code, or apply selective switching of selected bits of the previously generated scrambling code, or apply a combination of these to the previously generated scrambling code.

25. The descrambler circuit of claim 23, wherein Z is greater than X, and wherein the signal combining circuit is to apply the modified scrambling code by
splitting the X-bit scrambling code into N subsets of scrambling codes each having fewer than X bits, and selectively applying the N subsets of scrambling codes to multiple XOR blocks to generate a modified scrambling code from selected combinations of bits of the N subsets, to apply the modified scrambling code to a signal having more than X bits.

26. An electronic device with a memory subsystem, comprising:
a memory controller having a scrambler circuit including
a linear feedback shift register (LFSR) to generate an X-bit scrambling code at the memory controller;
a scrambling logic block to
select one or more bits of a previously generated scrambling code for modification, wherein the one or more bits correspond to one or more lanes over which scrambled data is to be transmitted, and
modify the one or more bits of the previously generated scrambling code to values of corresponding bits of the X-bit scrambling code to generate a modified scrambling code, wherein the one or more lanes include fewer than all lanes over which data scrambled with the modified scrambling code is to be transmitted; and
a signal combining circuit to apply the modified scrambling code to scramble a Z-bit transmit signal to output to a memory device, where Z is equal to or greater than X;
an input/output (I/O) interface coupled to the memory controller; and
a memory device coupled to the memory controller over the I/O interface, the memory device having a scrambler circuit including
a linear feedback shift register (LFSR) to generate the X-bit scrambling code at the memory device;
a scrambling logic block to generate the modified scrambling code via the same operations as the scrambling logic block of the memory controller;
a signal combining circuit to apply the modified scrambling code to unscramble the Z-bit transmit signal received from the memory controller; and
a touchscreen display coupled to generate a display based on data accessed from the memory device.

27. The electronic device of claim 26, wherein the scrambling logic blocks of both the memory controller and the memory device are to apply a nonlinear scrambling operation to the previously generated scrambling code, or apply dynamic bus inversion (DBI) to the previously generated scrambling code, or apply selective switching of selected bits of the previously generated scrambling code, or apply a combination of these to the previously generated scrambling code.

28. The electronic device of claim 26, wherein the scrambling logic blocks of both the memory controller and the memory device are to consecutively apply one or more second scrambling operations to a single scrambling code to generate multiple consecutive modified scrambling codes.

* * * * *